United States Patent [19]
Ibbott

[11] Patent Number: 5,102,515
[45] Date of Patent: Apr. 7, 1992

[54] METHOD AND APPARATUS FOR TREATING FLUID

[76] Inventor: Jack K. Ibbott, 17-7, Nishiazabu 4-chome, Minato-ku, Tokyo 106, Japan

[21] Appl. No.: 556,170

[22] Filed: Jul. 20, 1990

[51] Int. Cl.$^5$ .............................. C02F 5/00; C02F 1/00
[52] U.S. Cl. ................................. 204/150; 204/130; 204/149; 204/248; 204/272
[58] Field of Search .............. 204/130, 149, 141.5, 204/252, 260, 150, 248, 272

[56] References Cited

U.S. PATENT DOCUMENTS

| | | | |
|---|---|---|---|
| 672,230 | 4/1901 | Lacomme | 204/218 |
| 3,873,438 | 3/1975 | Anderson et al. | 204/268 |
| 4,378,276 | 3/1983 | Liggett et al. | 204/149 |
| 4,752,364 | 6/1988 | Dhooge | 204/151 |

Primary Examiner—John Niebling
Assistant Examiner—Arun S. Phasge
Attorney, Agent, or Firm—Wenderoth, Lind & Ponack

[57] ABSTRACT

The present invention is drawn to a method and apparatus for treating electrically conductive fluid. Positive and negative electrodes of electrically conductive materials having different electrochemical potentials are spaced apart and electrically isolated from one another so that the only electroconductive connection that develops an electrochemical potential between the electrodes is established by fluid to be treated extending between the electrodes. Fluid passing between the electrodes is therefore ionized. Because it has been found that superior effects can be achieved when the fluid is ionized under a voltage only condition in which there is relatively little current flow through the fluid, an electrical insulator is disposed between the positive and negative electrodes as extending across any shortest direct path therebetween. Thus, the electroconductive connection between the electrodes, that is established only by the body of fluid to be treated in the apparatus, is established through the fluid along a path that extends around the electrical insulator. Such a path, which is longer than any shortest direct path between the electrodes, defines a relatively long resistive path through the fluid between the electrodes and accordingly, current flow is inhibited.

29 Claims, 4 Drawing Sheets

METHOD AND APPARATUS FOR TREATING FLUID

BACKGROUND OF THE INVENTION

The present invention relates to a method and apparatus for treating electrically conductive fluid, that is fluid having some electroconductive capability. More particularly, the present invention relates to a method and apparatus for ionizing water having a high mineral content to prevent the precipitation of solids from the water which would tend to form a scale on the inner surface of piping through which the water flows, and to aid in the removal of a previously formed scale.

In systems using steel pipes, for example, through which water flows, a scale mainly consisting of ferric oxide is deposited on the inner surface of the pipes thereby reducing the inner diameter of the pipes resulting in a reduced flow rate and water pressure. The use of ionized water to remove such a scale is well known to those of ordinary skill in the art. When ionized water flows through piping having an oxide scale deposited on the inner surface thereof, the oxide scale is converted into a soft hydroxide (ferric hydroxide) which can be gradually removed.

U.S. Pat. No. 4,902,391 discloses a method and apparatus developed by the present inventor for ionizing, with great efficiency, fluids having a high dissolved solid content for the purpose of eliminating the problems caused by the deposition of substances such as ferric particles on the inner surface of fluid piping.

According to the method and apparatus disclosed in U.S. Pat. No. 4,902,391, two electrodes of electrically conductive materials having different electrochemical potentials, e.g. aluminum and carbon electrodes, are used to provide a voltaic cell structure which employs fluid to be treated as the electrolyte of the cell, whereby the fluid is ionized owing to the electric potential of the electrodes.

In the development research related to the method and apparatus disclosed in U.S. Pat. No. 4,902,391, it was found that reducing the electric current flow through the fluid between the electrodes and achieving a voltage only condition, or potential, provided the best performance. Such a condition was achieved when there was no electroconductive member, such as a resistor, connected between the electrodes, that is, when the electrodes were in what can be referred to as an "open circuit" condition.

Thus, in a unique embodiment featured in U.S. Pat. No. 4,902,391, the electroconductive connection between the electrodes was only established by the fluid to be treated extending therebetween, thereby providing a structure in which minimum current flow and maximum potential difference between the electrodes was expected.

In fact, the present inventor carried out tests, described below, to illustrate that when electric current flows through the fluid and between the electrodes is reduced, there is an improvement in the ability of the device to prevent the precipitation of solids (Ca, Mg and Si) dissolved in the fluid and thus prevent the formation of a scale, particularly a silica scale which is the most difficult type of scale to prevent.

Various apparatus were constructed in which there were both a direct electrical connection established between the electrodes, and in which electrical resistors were connected between the electrodes. The resistors used ranged from low values of resistance to very high values of resistance (several millions of ohms). In a series of tests conducted with the assemblies, it was observed that the precipitation of Ca, Mg and Si particles commenced very early when there was a direct electrical connection between the electrode members, i.e. maximum current flow. When the resistance between the electrodes was increased to successively reduce the electric current flow, it was observed that the precipitation of the Ca, Mg and Si particles became further and further delayed along with a corresponding reduction in the amount of precipitated material and hence a reduction in the formation of a crystalline scale.

As these tests were continued, and the values of resistance were increased to reduce the electric current flow, the formation of a Ca, Mg and Si precipitate ceased and only a colloidal suspension was observed. And, with an even further increase in resistance between the electrodes, even the colloidal suspension began to form more slowly and then only in water having a high degree of hardness and greater electroconductive capability. The above tests were conducted with standard tap water having an initial electroconductivity of about 200 $\mu$S/cm and with additional samples of water having portions thereof evaporated to obtain test samples of increased total hardness and greater electroconductive capability.

Two basic effects therefore became apparent from an analysis of the above-described tests. First, as the resistance was increased between the electrodes, the precipitated material took on a more amorphous form. Secondly, with an increase in the resistance between the electrodes, a gradually increasing amount of colloidal suspension which did not readily participate was formed as well.

From such an analysis of the test results, it is postured that electric current flow through the fluid, as provided by a direct electrical connection between the electrodes or by a relatively small resistance, caused early precipitation of the dissolved solids (Ca, Mg, Si). It is also noted that precipitated material under such conditions was observed under a microscope as having a crystalline structure.

On the other hand, when there was relatively very little current flow and a condition of nearly voltage potential only was provided, the coalescence and crystallization of the dissolved solids did not occur and only a colloidal suspension of particles was formed due to the ionization of the fluid giving rise to electric charges of the same polarity (positive or negative) on the particles. In other words, the electric charges of the same polarity held the particles apart and prevented their coalescence and crystallization.

Although the above-described embodiment disclosed in U.S. Pat. No. 4,902,391, in which only the fluid to be treated was used to establish an electroconductive connection between the electrodes, was designed to achieve a voltage potential only condition, very minute currents were generated through the fluid and between the electrodes due to the changing electroconductivity of the fluid as it passed between the electrodes from entrance to exit. If the initial electroconductivity of the fluid to be treated is high, then even a greater amount of current is generated thereby reducing the effectiveness of the device to prevent the precipitate of dissolved solids and the formation of scale. Accordingly, in the device disclosed in U.S. Pat. No. 4,902,391, the efficiency and capability thereof to prevent the formation of a scale (Ca, Mg and Si) and to aid in the removal of a previously deposited scale in fluid containment systems commences to fall off at electroconductivity levels approaching 1,000 µS/cm. Although this is highly satisfactory for normal water supply sources, it is unsatisfactory for many industrial applications which employ subterranean water often having a high dissolved solvent content level and electroconductivity levels in the order of 3,000 µS/cm.

With the continuation of research for the further reduction of electric current flow, it became obvious that the spacing between the electrodes could be increased to provide an additional reduction of electric current flow. However, such a solution was limited by the physical restraints imposed by the systems in which the ionizing apparatus was to be employed. In addition, the systems also impose limitations on the size of the electrodes which could be employed. And, since the size of the electrodes corresponds to the area over which the fluid can be effectively treated in the system, then such physical restraints on the size of the electrodes and the spacing therebetween often renders impractical the solution of spacing the electrodes far enough apart to sufficiently reduce the electric current flow.

SUMMARY OF THE INVENTION

An object of the present invention is to provide a method and apparatus in which relatively little current is generated during the ionization of electrically conductive fluid between electrodes having different electrochemical potentials, whereby the precipitation of dissolved solids in even fluid having a high dissolved solid content level and high electroconductivity level can be prevented.

Another object of the present invention is to provide a method and apparatus for treating fluid in which very little electric current is generated through the fluid to be treated between electrodes having different electrochemical potentials even when such electrodes cannot be spaced very far apart from one another, whereby any physical restraints imposed by a system in which the apparatus is to be employed do not diminish the effectiveness of the present invention in preventing the formation of a scale on the pipes of a system and the removal of such a previously deposited scale.

The above objects are achieved according to the present invention by the provision of an electrical insulator disposed between electrically isolated positive and negative electrodes having different electrochemical potentials. The electrical insulator extends across any shortest direct path between the spaced apart electrically conductive material of the electrodes. Thus, current flow in a body of fluid to be treated between the electrodes is inhibited because the electroconductive connection between the electrodes is established only through the body of fluid along a path that extends around the electrical insulator so as to be longer than any shortest direct path between the electrodes. In other words, the electrical insulator increases the path of resistance through the fluid between the electrodes by being interposed directly between the positive and negative electrodes, whereby such an increase in the resistive path restricts the current flow during ionization of the fluid.

Accordingly, even when fluid to be treated has a high degree of electroconductivity caused by for example, a high dissolved solid content level, due to the fact that a long resistive path is provided through the fluid between the electrodes and around the electrical insulator, current flow is correspondingly inhibited whereby the increased effects described above can be achieved.

And, even when the electrodes must be spaced somewhat close together owing to space limitations imposed by the system in which the electrodes are to be employed, again, the provision of the electrical insulator can increase the length of the resistive path between the electrodes and through the fluid such that the fluid can be effectively ionized with little current flow therethrough.

BRIEF DESCRIPTION OF THE DRAWINGS

Further objects, features and advantages of the present invention will become apparent to those of ordinary skill in the art by reviewing the detailed description below of preferred embodiments in conjunction with the attached drawings, in which.

DETAILED DESCRIPTION OF THE PREFERRED EMBODIMENTS

Figure 1:
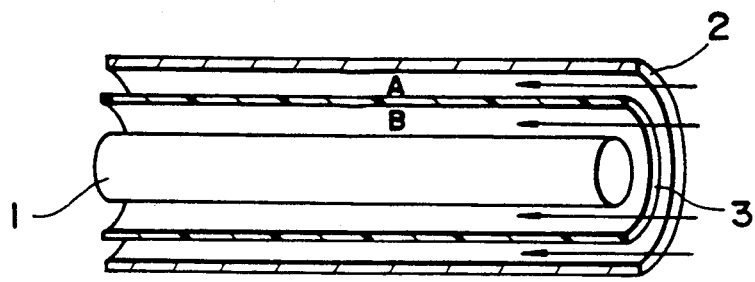
FIG. 1 is a perspective view, partly in section, of an essential part of an embodiment of an apparatus for treating electrically conductive fluid according to the present invention, which essential part is constituted by positive and negative electrodes and an electrical insulator interposed therebetween.

In the figures, reference numeral 1 is used to designate a positive electrode of electrically conductive material while reference numeral 2 designates a negative electrode of electrically conductive material that is spaced apart and electrically isolated from the electrically conductive material of the positive electrode 1. The electrically conductive materials of the positive 1 and negative 2 electrodes have different electrochemical potentials so that when a body of electrically conductive fluid to be treated flows in the direction of the arrows between the electrodes 1, 2, an electroconductive connection that develops an electroconductive potential between the electrodes is only established through the body of fluid whereby the fluid is ionized.

Reference numeral 3 designates an electrical insulator disposed between the positive 1 and negative 2 electrodes. The purpose of the electrical insulator 3 is to create a relatively long resistive path through the body of fluid between the electrodes 1 and 2 which inhibits current flow through the body of fluid.

Referring now to FIG. 1, the tubular electrical insulator 3 is interposed between a rod-shaped positive electrode 1 and a tubular electrode 2. The electrical insulator 3 extends across any shortest direct path between the electrodes 1 and 2, i.e. any path extending radially from the rod-shaped positive electrode 1 to the tubular negative electrode 2. As the body of fluid flows over the electrodes 1, 2 so as to extend therebetween, an electroconductive connection between the electrodes 1, 2 is established through the body of fluid along a path that extends around the ends of the electrical insulator 3. As can be seen in FIG. 1, the positive electrode 1, the negative electrode 2, and the electrical insulator 3 all have substantially the same length. Because the electrical insulation provided by electrical insulator 3 terminates at the respective ends of the positive electrode 1 and negative electrode 2, a relatively short resistive path is provided between the electrodes and so, the effect of the electrical insulator 3 is limited. Although this apparatus does provide only a slight improvement when incorporated into small systems as compared to similar apparatus in which the electrical insulator 3 is not employed, it was found to be rather effective for relatively large systems.

Figure 2:
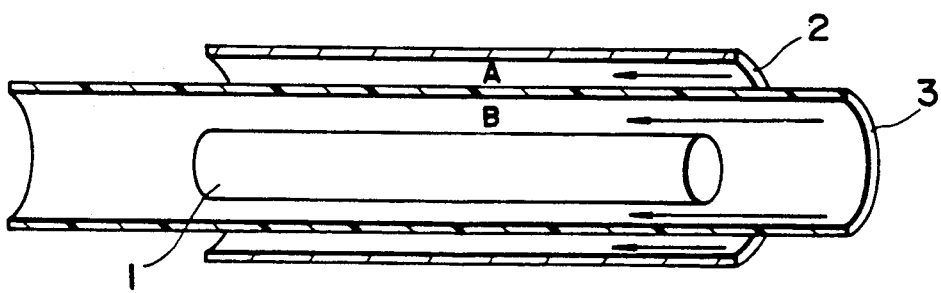
FIG. 2 is a perspective view, partly in section, of a modified form of the first embodiment shown in FIG. 1.

In the modified version shown in FIG. 2, the electrical insulator 3 extends longitudinally beyond the respective ends of the positive 1 and negative 2 electrodes. Therefore, current flow between the electrodes must occur through the body of fluid along a path of resistance that extends around the longitudinally extending ends of the electrical insulator 3. In this case, as compared to that form of the essential part of the present invention shown in FIG. 1, the resistance is increased by approximately twice the difference between the length of the electrical insulator 3 and the length of the positive electrode 1 (or the negative electrode 2 of substantially equal length). And, although the electric current flow between the electrodes 1, 2 is reduced compared to the apparatus shown in FIG. 1, the voltage potential is not reduced. When such an apparatus was employed in small units, excellent results were achieved with water having an electroconductivity level of 2,720 µS/cm.

Figure 3:
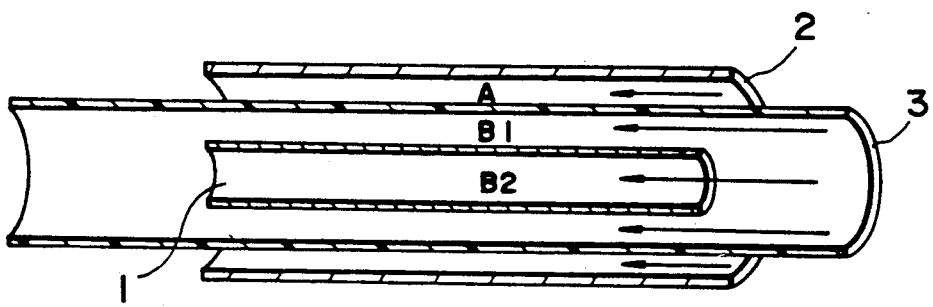
FIG. 3 is a perspective view, in section, of the essential part of another embodiment of an apparatus for treating electrically conductive fluid according to the present invention.

In the embodiment of FIG. 3, the positive electrode 1 is tubular, and the electrical insulator 3 is radially interposed between and spaced from the radially innermost positive electrode 1 and the radially outermost tubular electrode 2. The advantages of employing a tubular positive electrode 1, as compared to the rod-shaped positive electrode of the embodiment shown in FIGS. 1 and 2, are that the tubular electrode 1 offers less resistance to fluid flow and presents an increased surface area (inner and outer surfaces) over which the fluid can flow. Thus, for a system in which any particular flow rate is desired, the embodiment of FIG. 3 can be used having smaller components than if the embodiment shown in FIGS. 1 and 2 were to be used.

Figure 4:
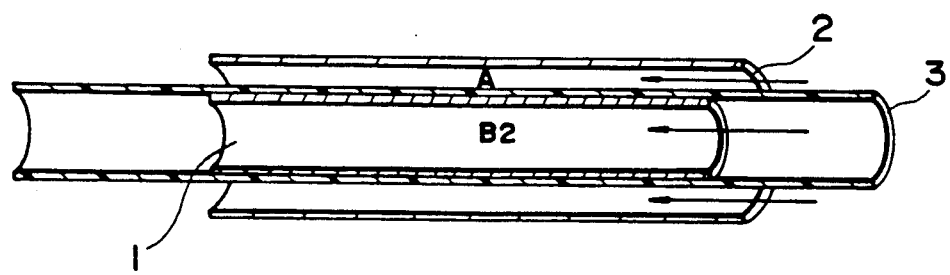
FIG. 4 is a perspective view of an essential part of still another embodiment of an apparatus for treating electrically conductive fluid according to the present invention.

The embodiment of FIG. 4 even accommodates smaller systems. In this embodiment, the electrical insulator 3 is spaced radially inwardly from the negative electrode 2, forming the radially outermost electrode, and is disposed around and in contact with the positive electrode 1 which forms the radially innermost electrode.

Figure 5:
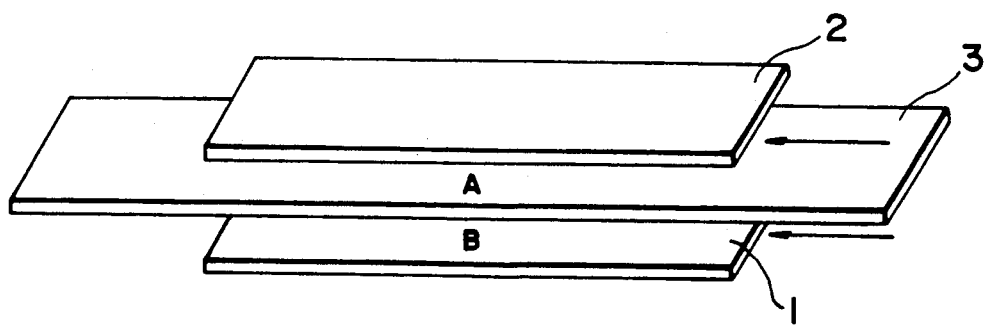
FIG. 5 is a perspective view of an essential part of still yet another embodiment of an apparatus for treating electrically conductive fluid according to the present invention.
Figure 6:
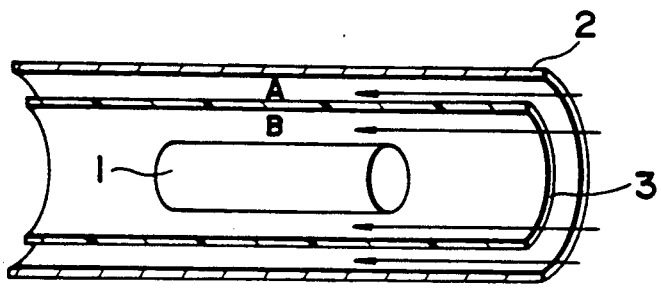
FIGS. 6 and 7 are perspective views, partly in section, of further modified forms of the essential part of the present invention shown in FIG. 1.
Figure 7:
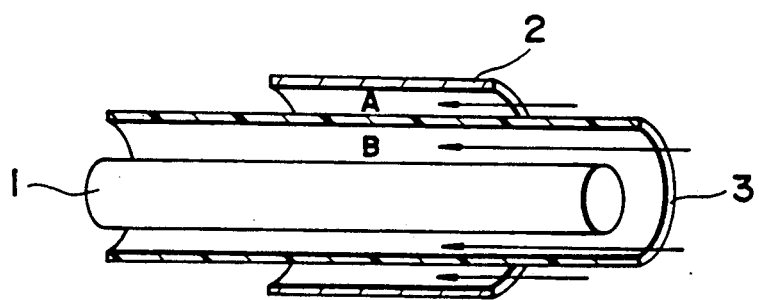

Up until now, all of the constituent elements of the essential part of the present invention, i.e. the positive electrode 1, the negative electrode 2 and the electrical insulator 3, have been described as having a tubular (circular) or polygonal (round) cross section. This is because such features particularly lend themselves to use in fluid piping and fluid containers which mostly have circular cross-sectional components. However, the present invention also contemplates the use of plate electrodes as shown in the embodiment of FIG. 5. In this embodiment, the positive electrode 1, the negative electrode 2 and the electrical insulator 3 are each a respective flat plate. As in the previous embodiments, the electrical insulator 3 is disposed between the positive 1 and negative 2 electrodes and extends across any shortest direct path therebetween (in this case any path extending perpendicular to and between the flat plate electrodes 1, 2). Such flat elements can be installed into a pipe having a square or rectangular cross section and provided with appropriate fittings at each end as attaching means for securing the pipe (apparatus) in-line to standard circular cross-sectional piping of a fluid system. In the essential parts shown in FIGS. 6 and 7, which are further modified forms of that shown in FIG. 1, one of the positive and negative electrodes (the negative electrode 2 in FIG. 6 and the positive electrode 1 in FIG. 7) has substantially the same length as the electrical insulator 3 while the other of the electrodes (positive electrode 1 in FIG. 6 and negative electrode 2 in FIG. 7) is shorter than the electrical insulator 3 and said one of the electrodes. Although these embodiments still cause the electroconductive connection between the electrodes 1, 2 to be established through the body of fluid along a path that is longer than any shortest direct path between the electrodes 1, 2 (radial path between positive electrode 1 and negative electrode 2), the length of such a path will obviously be shorter than that provided in the embodiments of FIGS. 2-5 in which the electrical insulator 3 is substantially longer than and extends longitudinally beyond the ends of each of the electrodes 1, 2. However, it has been found that the apparatus of FIGS. 6 and 7 operate well when treating fluid having relatively high levels of electroconductivity.

Figure 8:
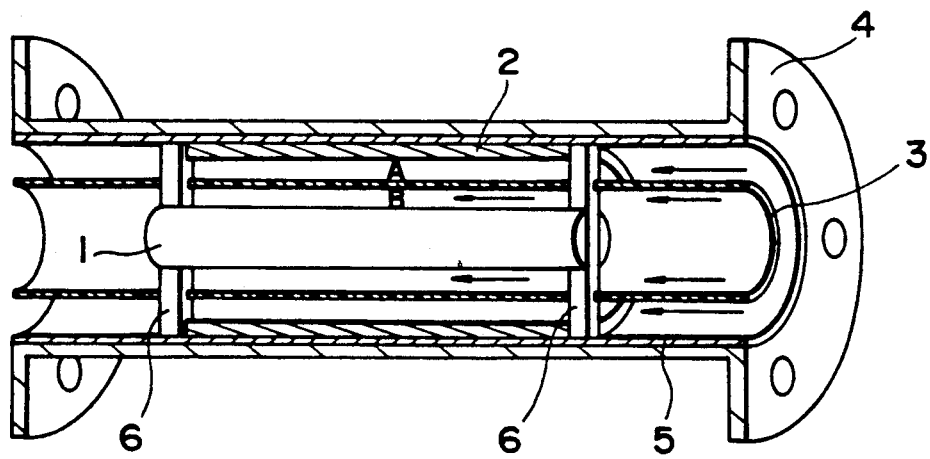
FIG. 8 is a perspective view, partly in section, of an apparatus for treating electrically conductive fluid according to the present invention, employing the essential part shown in FIG. 2.

A practical application of the present invention is illustrated in FIG. 8. The apparatus of FIG. 8 includes a pipe 4 having flanges at the ends thereof which serve as attaching means for securing the apparatus in-line with piping of a fluid system. When the pipe 4 is metal, an inner lining 5 of an electrically insulative material is provided between the pipe 4 and the outer surface of negative electrode 2. Such an inner lining of electrically insulative material is necessary to prevent electrical contact between the pipe 4 and the negative electrode 2 which would tend to give rise to electrolysis and corrosion. The positive electrode 1, the electrical insulator 3 and the negative electrode 2 are supported in a concentric relation by at least one electrically insulative supporting member 6. Each electrically insulative supporting member 6 extends diametrically of the pipe 4 and supports the electrode 1 and the electrical insulator 3 within the pipe 4 without providing an electroconductive path between the electrodes 1, 2. The electrical insulator 3 extends nearly the entire length of the pipe 4, beyond the respective ends of the electrodes 1, 2.

With further respect to the apparatus shown in FIG. 8, the pipe 4 can also be fabricated from PVC, in which case the inner lining 5 of electrically insulative material is not necessary.

Figure 9:
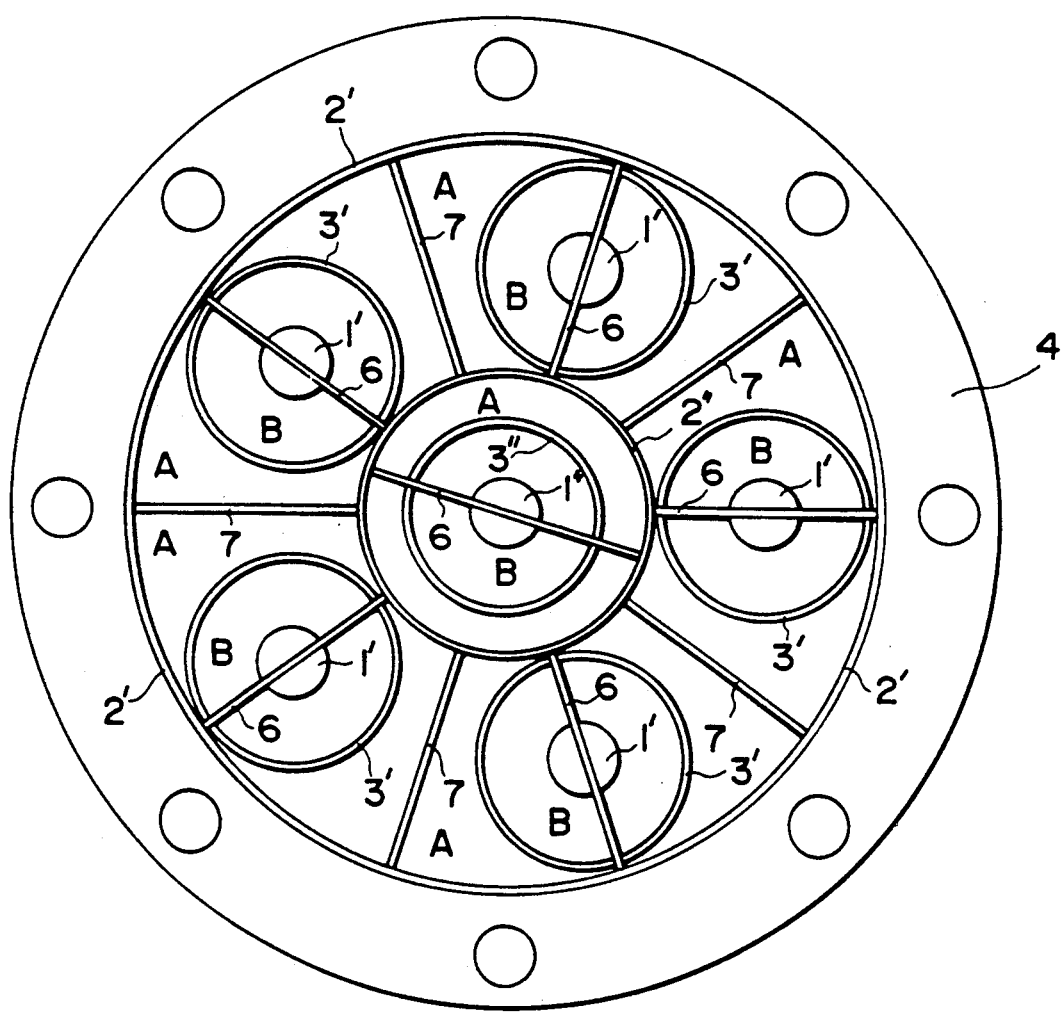
FIG. 9 is an end view of another apparatus for treating electrically conductive fluid according to the present invention.

In order to have a large capacity which can handle high flow rates, the constituent elements of the present invention may be arranged in parallel, as shown in the apparatus of FIG. 9 in which six individual units of constituent elements are integrated. The outer five radially spaced units have a common negative electrode formed of a first tubular portion 2' of electrical conductive material and a plurality of flat plates 7 of electrically conductive material extending from the first tubular portion 2'. The plurality of flat plates 7 extend radially inwardly of the first tubular portion 2' from locations spaced along an inner surface thereof so as to define a plurality of radial sectors within the tubular portion 2'. A respective tube 3' of electrically insulative material is disposed in each of the sectors. And, to complete the outer five radially spaced units, the positive electrode includes a respective rod 1' of electrically conductive material disposed within each tube 3' of electrically insulative material. Supporting members 6' of electrically insulative material are connected between each respective rod 1 and the respective tube 3' so as to support each rod 1 within a respective tube 3'. The centralmost unit includes a second tubular portion 2" of the negative electrode that is generally centrally located within the first tubular portion 2'. The flat plates 7 of the negative electrode extend radially outwardly from the second tubular portion 2" to the first tubular portion 2'. A central tube 3" of electrically insulative material is spaced radially inwardly of the second tubular portion 2" of the negative electrode. And, finally, the positive electrode also includes a rod 1 of electrically conductive material supported by the at least one supporting member 6" within the central tube 3" of the electrical insulator. Other parallel arrangements of multiple units of the type shown in FIG. 9 can of course be provided.

In the above description of the preferred embodiments of FIGS. 1-4 and 6-9, the positive electrode 1 has been shown as a radially innermost electrode while the negative electrode 2 has been shown as the radially outermost electrode. Of course, the position of such electrodes can theoretically be reversed. Further, the negative electrode is preferably an aluminum electrode while the positive electrode is preferably a carbon electrode. The electrical insulator 3 may comprise polyethylene or TEFLON.

A further feature of the present invention resides in the selection of the ratio of the volumes of the fluid provided to each side of the electrical insulator 3, i.e. the ratio of a volume of fluid-accommodating space between the electrically conductive material of the positive electrode 1 and the electrical insulator 3 and the volume of fluid-accommodating space between the electrically conductive material of the negative electrode 2 and the electrical insulator 3. The selection of such a volume ratio can be made for each particular fluid to be treated so as to provide optimum effects.

Figure 10:
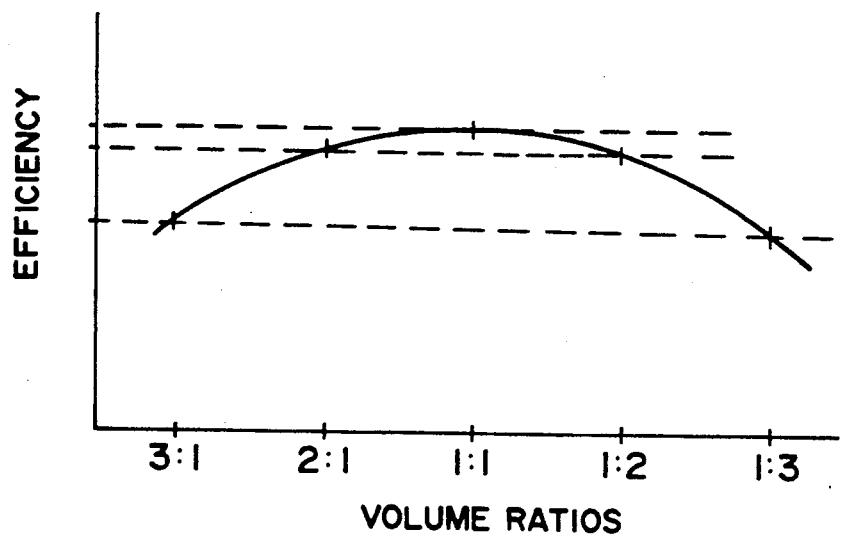
FIG. 10 is a graph of the ratios of the volume of fluid that can be accommodated between one of the electrodes and the electrical insulator and the volume of fluid that can be accommodated between the other of the electrodes and the electrical insulator, illustrating the relationship of such ratios to the efficiency of the present invention.

Tests conducted with varying volume ratios have been carried out which show the effects thereof on the efficiency of the present invention as illustrated in the graph of FIG. 10. In referring to this figure, the volume of space between the electrically conductive material of the positive electrode 1 and the electrical insulator 3 will be referred to as the positive electrode volume, while the volume of space between the electrically conductive material of the negative electrode 2 and the electrical insulator 3 will be referred to as the negative electrode volume. The volume ratios shown along the horizontal axis of the graph of FIG. 10 represent the ratios of positive electrode volume to negative electrode volume. As can be seen from FIG. 10, changes in the ratios of positive electrode volume to negative electrode volume between 2:1 and 1:2 do not have a substantial effect on efficiency. However, changes from the ratios of 3:1 to 2:1 and from 1:2 to 1:3 show a notable change. Based on these results, a very effective treatment of fluids can be achieved when positive electrode volume to negative electrode volume ratios of between 2:1 and 1:2 are provided. For peak effectiveness, a 1:1 ratio appears to be necessary. However, there are certain circumstances where a more positive ionization or a more negative ionization of the fluid to be treated is desired. In such a case, the positive electrode volume to negative electrode volume ratio can be selected to allow a larger volume of fluid to pass into the space between the electrically conductive material of the positive electrode and the electrical insulator than into the space between the electrically conductive material of the negative electrode and the electrical insulator, or vice versa.

In the figures, the negative electrode volume is represented by character A while the positive electrode volume is represented by the character B.

Thus, as shown in FIG. 1, fluid flowing through the apparatus is separated into a volume A which passes over the negative electrode 2 and a volume B which passes over the positive electrode 1. In the embodiment of FIG. 3, the positive fluid volume includes separated volumes of fluid B1, B2 which flow over the positive electrode 1 in contact with the inner and outer surfaces thereof, respectively.

With the insulator 3 disposed in contact with the positive electrode 1 as shown in embodiment of FIG. 4, it is very easy to ascertain the positive electrode volume B2 whereby accurate volume ratios, such as equal ratios for optimum efficiency, can be provided.

An advantage associated with the essential part of the apparatus shown in the embodiment of FIG. 5 resides in the fact that the volume ratios A:B of fluid contacting the electrodes 1, 2 can be easily adjusted by simply moving the electrical insulator 3 toward or away from either of the electrodes while maintained parallel thereto. Such provides an ideal method for investigating the effects of different fluid volume ratios. With the tubular or polygonal cross-sectional elements employed in the embodiments of FIGS. 1-4 and 6-9, constituent parts having different diameters must be substituted to provide different volume ratios.

Referring once again to FIG. 8, fluid flowing through a pipeline in which the apparatus of the present invention is connected in-line will separate into two streams at the upstream end of the electrical insulator 3. The streams will include a volume A of fluid and a volume B of fluid flowing over and contacting the negative 2 and positive 1 electrodes, respectively. The fluid streams are influenced by an electric potential at each electrode, volume A being negatively influenced at negative electrode 2 and volume B being positively influenced at positive electrode 1. The streams of fluid then exit from the apparatus and join together once again as the streams pass over the downstream end of the electrical insulator 3.

Thus, as can be seen, the electrical insulator 3 serves as a separator member provided between the negative electrode and the positive electrode, and each end of the electrical insulator 3 extends longitudinally beyond the respective ends of the electrodes 1, 2. Thus, the fluid is separated into predetermined volumes before passing over the electrodes and each separated volume of fluid contacts a respective electrode so as to form a leg of a resistive path between the electrodes. Such structure causes a relatively long resistive path between the electrodes to be established whereby a high resistance to electric current flow through the fluid and between the electrodes is established. Therefore, electrical current flow can be limited to a minimum by selecting the length of the electrical insulator. Such structure is very effective for ionizing highly electroconductive fluids in a manner which will prevent dissolved solids from precipitating therefrom.

Although the present invention has been fully described in connection with the preferred embodiments thereof with reference to the accompanying drawings, it is to be noted that numerous changes and modifications will become apparent to those skilled in the art. Accordingly, such changes and modifications, which are seen to be within the true spirit and scope of the present invention, are to be understood as encompassed by the present invention as defined by the appended claims.

What is claimed is:

1. Apparatus for treating electrically conductive fluid, said apparatus comprising:

a positive electrode of electrically conductive material;

a negative electrode of electrically conductive material that is spaced apart from the electrically conductive material of said positive electrode in a direction perpendicular to the direction in which a body of fluid is to flow through the apparatus, the electrically conductive materials of said electrodes being electrically isolated from one another in the apparatus and having different electrochemical potentials such that when a body of electrically conductive fluid to be treated in the device extends between said electrodes, an electroconductive connection that develops an electroconductive potential between said electrodes is only established through the body of fluid whereby the fluid is ionized; and an electrical insulator disposed between said positive and said negative electrodes, said insulator extending across each and every shortest direct path between the spaced apart electrically conductive material of said electrodes so as to form a barrier against the flow of electrons between said electrodes along each and every shortest direct path therebetween, and said insulator dividing the apparatus into first and second fluid-accommodating spaces at opposite sides of the barrier provided by said insulator, respectively, the first fluid-accommodating space being bounded by the electrically conductive material of said positive electrode, and the second fluid-accommodating space being bounded by the electrically conductive material of said negative electrode, the fluid-accommodating spaces constituting parallel flow channels separated by said insulator and through which channels the body of fluid flows simultaneously in the device in respective streams one of which streams contacts the electrically conductive material of said positive electrode and the other of which streams contacts the electrically conductive material of said negative electrode, and the apparatus defining an unobstructed space between said electrodes around said insulator so that said insulator will inhibit current flow in the body of fluid to be treated by the apparatus by causing the electroconductive connection between said electrodes to be established through the body of fluid along a path that extends around said electrical insulator so as to be longer than said any shortest direct path.

2. Apparatus for treating electrically conductive fluid as claimed in claim 1, wherein said electrical insulator is so disposed relative to said positive and said negative electrodes that said first fluid-accommodating space has a volume that is equal in magnitude to a volume of said second fluid-accommodating space.

3. Apparatus for treating electrically conductive fluid as claimed in claim 1, wherein said electrical insulator is so disposed relative to said positive and said negative electrodes that said first fluid-accommodating space has a volume that is different in magnitude from a volume of said second fluid-accommodating space.

4. Apparatus for treating electrically conductive fluid as claimed in claim 1, wherein said positive electrode, said negative electrode and said electrical insulator all have substantially the same length.

5. Apparatus for treating electrically conductive fluid as claimed in claim 1, wherein one of said positive and negative electrodes has substantially the same length as said electrical insulator, and the other of said electrodes is shorter than said electrical insulator and said one of the positive and negative electrodes.

6. Apparatus for treating electrically conductive fluid as claimed in claim 1, wherein said electrical insulator extends longitudinally beyond respective ends of said positive and said negative electrodes in the apparatus.

7. Apparatus for treating electrically conductive fluid as claimed in claim 1, wherein one of said positive and said negative electrodes is rod-shaped.

8. Apparatus for treating electrically conductive fluid as claimed in claim 7, wherein the other of said electrodes is tubular and extends around said one of said electrodes, and said electrical insulator is tubular and is interposed between said electrodes.

9. Apparatus for treating electrically conductive fluid as claimed in claim 7, and further comprising a pipe in which said electrodes and said electrical insulator are disposed, said pipe having attaching means for securing the apparatus in-line to piping, and at least one electrically insulative supporting member extending diametrically of said pipe and connected to said one of said electrodes and said electrical insulator so as to support said one of said electrodes and said electrical insulator within said pipe.

10. Apparatus for treating electrically conductive fluid as claimed in claim 9, wherein said pipe is metal, and includes an inner lining of electrically insulative material.

11. Apparatus for treating electrically conductive fluid as claimed in claim 9, wherein said pipe comprises PVC.

12. Apparatus for treating electrically conductive fluid as claimed in claim 1, wherein both of said electrodes and said electrical insulator are tubular, said electrical insulator being interposed between a radially innermost one of the tubular electrodes and a radially outermost one of the tubular electrodes.

13. Apparatus for treating electrically conductive fluid as claimed in claim 12, wherein said electrical insulator is radially spaced from each of said electrodes.

14. Apparatus for treating electrically conductive fluid as claimed in claim 12, wherein said electrical insulator is spaced radially inwardly of the radially outermost one of said electrodes and is disposed around and in contact with the radially innermost one of said electrodes.

15. Apparatus for treating electrically conductive fluid as claimed in claim 1, wherein said positive electrode, said negative electrode and said electrical insulator are each a respective flat plate.

16. Apparatus for treating electrically conductive fluid as claimed in claim 1, wherein one of said positive and said negative electrodes includes a first tubular portion of electrically conductive material and a plurality of flat plates of electrically conductive material extending from said first tubular portion.

17. Apparatus for treating electrically conductive fluid as claimed in claim 16, wherein said plurality of flat plates extend radially inwardly of said first tubular portion from locations spaced along an inner surface thereof so as to define a plurality of sectors within said tubular portion, said electrical insulator includes a respective tube of electrically insulative material disposed in each of said sectors, and said other of said electrodes includes a respective rod of electrically conductive material disposed within each said respective tube, and further comprising supporting members of electrically insulative material connected between each said respective rod and said respective tube and supporting each said respective rod within a said respective tube.

18. Apparatus for treating electrically conductive fluid as claimed in claim 17, wherein said one of said positive and negative electrodes further includes a second tubular portion generally centrally located within said first tubular portion and from which second tubular portion said flat plates extend radially outwardly to said first tubular portion, said electrical insulator further includes a central tube of electrically insulative material spaced radially inwardly of the second tubular portion of said one of said electrodes, and the other of said electrodes further includes a rod of electrically conductive material supported by said supporting members within the central tube of said electrical insulator.

19. Apparatus for treating electrically conductive fluid as claimed in claim 1, wherein said negative electrode is an aluminum electrode.

20. Apparatus for treating electrically conductive fluid as claimed in claim 1, wherein said positive electrode is a carbon electrode.

21. Apparatus for treating electrically conductive fluid as claimed in claim 1, wherein said positive electrode is a carbon electrode and said negative electrodes is an aluminum electrode.

22. A method treating electrically conductive fluid, said method comprising:

providing a positive electrode of electrically conductive material, providing a negative electrode of electrically conductive material that is spaced apart from the electrically conductive material of said positive electrode in a direction in which a body of fluid is to flow, and which is electrically isolated from and has an electrochemical potential that is different than that of the electrically conductive material of said positive electrode;

providing an electrical insulator between said positive and said negative electrodes that extends across each and every shortest direct path between the spaced apart electrically conductive material of said electrodes so as to form a barrier against the flow of electrons between said electrodes along each and every shortest direct path therebetween, and which insulator is disposed in such a way as to leave an unobstructed space between said electrodes around the insulator, and which insulator divides the apparatus into first and second flow-accommodating spaces at opposite sides of the barrier provided by said insulator, respectively, the first fluid-accommodating space being bounded by the electrically conductive material of said positive electrode, and the second fluid-accommodating space being bounded by the electrically conductive material of said negative electrode, the fluid-accommodating spaces constituting parallel flow channels separated by said insulator; and causing a body of fluid to flow simultaneously through said flow channels over said electrodes, and over said electrical insulator so as to establish an electroconductive connection of said electrodes only through the body of fluid along a path that extends through said unobstructed space around said electrical insulator between said electrodes and that is longer than said each and every shortest direct path, thereby causing ionization of the body of fluid in a state of relatively little current flow through the body of fluid.

23. A method of treating electrically conductive fluid as claimed in claim 22, wherein the steps of providing said electrodes and said electrical insulator comprise providing an electrical insulator having a length that is greater than that of said positive electrode and that of said negative electrode.

24. A method of treating electrically conductive fluid as claimed in claim 22, wherein the steps of providing said electrodes and said electrical insulator comprise providing a positive electrode, a negative electrode and an electrical insulator all having the same length.

25. A method of treating electrically conductive fluid as claimed in claim 22, wherein the steps of providing said electrodes and said electrical insulator comprise providing an electrical insulator and one of a positive and negative electrode which have the same length, and the other of said positive and negative electrodes which has a length shorter than said one of the positive and negative electrodes.

26. A method of treating electrically conductive fluid as claimed in claim 22, wherein the step of providing a positive electrode comprises providing a carbon electrode.

27. A method of treating electrically conductive fluid as claimed in claim 22, wherein the step of providing a negative electrode comprises providing an aluminum electrode.

28. A method of treating electrically conductive fluid as claimed in claim 22, wherein the step of providing a negative electrode comprises providing an aluminum electrode, and the step of providing a positive electrode comprises providing a carbon electrode.

29. A method of treating electrically conductive fluid as claimed in claim 22, wherein the step of causing a body of fluid to flow comprises connecting said electrodes and said electrical insulator in-line with piping of a fluid system.

* * * * *